United States Patent [19]

Rieke

[11] Patent Number: 4,883,373
[45] Date of Patent: Nov. 28, 1989

[54] MOUNTING ARRANGEMENT FOR A BEARING ASSEMBLY

[75] Inventor: Brent E. Rieke, Aurora, Ill.

[73] Assignee: Caterpillar Inc., Peoria, Ill.

[21] Appl. No.: 258,532

[22] Filed: Oct. 17, 1988

[51] Int. Cl.⁴ ............................................. F16C 19/38
[52] U.S. Cl. ..................................... 384/585; 384/539
[58] Field of Search ............... 384/585, 540, 584, 539, 384/541, 542

[56] References Cited

U.S. PATENT DOCUMENTS

| | | | |
|---|---|---|---|
| 1,645,503 | 10/1927 | Vile ...................................... | 384/540 |
| 3,112,965 | 12/1963 | Popiel .................................. | 384/585 |
| 4,029,166 | 6/1977 | Haak ................................... | 180/9.62 |
| 4,163,486 | 8/1979 | Kagata ................................. | 192/35 |

Primary Examiner—Lenard A. Footland
Attorney, Agent, or Firm—William C. Perry

[57] ABSTRACT

In a drive mechanism where there are relatively rotating components, it is common practice to use roller bearings to accommodate relative rotation between various components. In order to properly maintain the position of the bearing assembly with respect to the components, some form of locking mechanism is commonly employed. Normally, the locking mechanism requires additional components, such as a locking washer, to be used in conjunction with those used to mount the bearing assembly. This results in an increase in the size and complexity of the drive mechanism. In addition, when a locking washer is utilized, sufficient space must be available to properly "set" the locking washer with respect to the bearing assembly after it has been properly adjusted. Many times use of such locking components requires the machining of adjacent components which serves to anchor the locking mechanism. The additional machining requires the components to be of a larger size to obtain proper fatigue lift. This, coupled with the cost of the additional machining, greatly increases the expense of the unit. The present invention overcomes these drawbacks by providing a locking mechanism that utilizes a nut member 72 that is threaded on a shaft 36 to position a bearing assembly 42 on the shaft 36. A planet carrier 80 is splined to the shaft 36 adjacent the nut member 72 to prevent it from rotation with respect to the shaft 36. The configuration of the spline arrangement 76,82 permits easy installation of a bearing assembly 40,42 in areas that are inaccessible with very little adjustment required to achieve proper assembly.

18 Claims, 2 Drawing Sheets

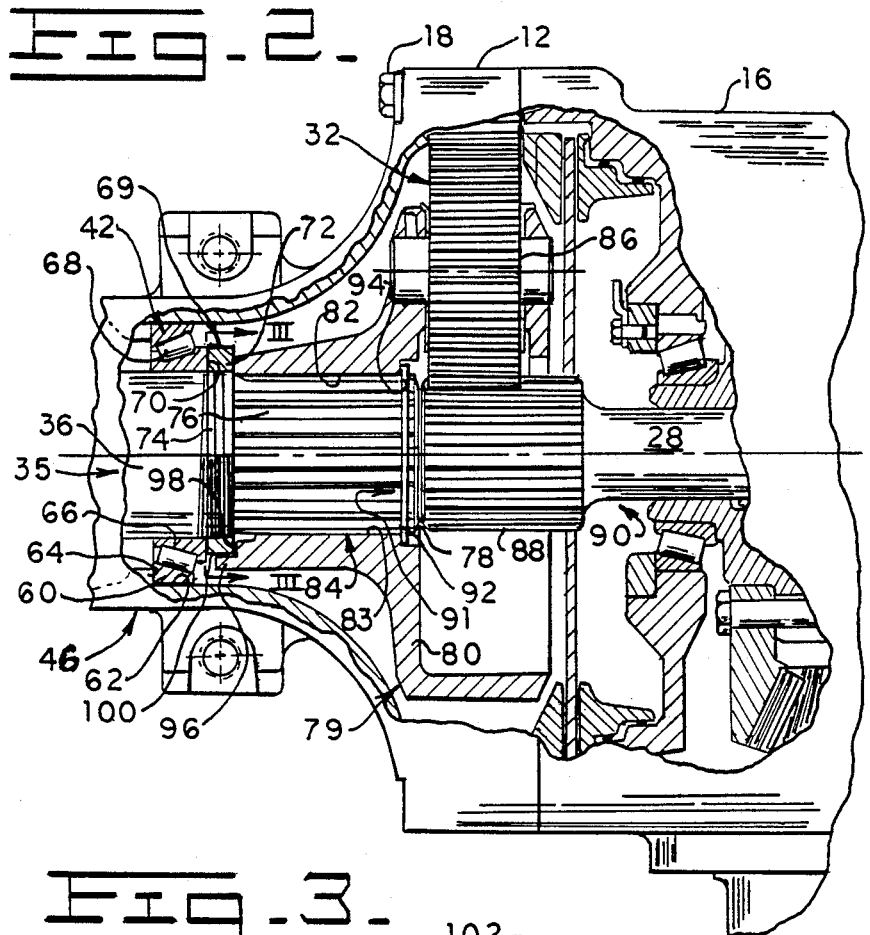
Fig-2-
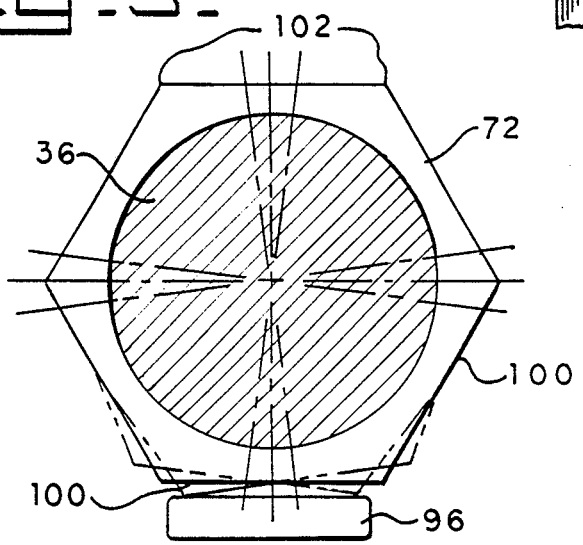
Fig-3-

MOUNTING ARRANGEMENT FOR A BEARING ASSEMBLY

DESCRIPTION

1. Technical Field

This invention relates to a mounting arrangement for a bearing assembly and more particularly to a means by which the position of the bearing is maintained.

2. Background Art

In any gear drive assembly that contains a plurality of shafts and gears that rotate relative to one another, such as final drive or differential mechanism, bearings must be utilized between the components to accommodate the relative rotation. The bearings usually have a pair of races, one of which is secured to one component while the other is secured to the other, relatively rotating component. The races are normally secured to the respective components by a nominal press fit to maintain its position during assembly. Because the amount of circumferential interference between each race and the respective component to which it is mounted must be nominal to facilitate assembly, the races are subject to movement by forces created in the drive mechanism as it operates under load. Because of this, an additional means of securing the position of the bearing must be utilized in order to maintain the proper pre-load in the bearing.

One common mounting of a bearing between, for example, a housing and a relatively rotating shaft, includes a counterbore in the housing into which the outer diameter of the outer race is positioned. The race is thereby limited from movement in one axial direction by its contact with a wall of the counterbore. The other race is mounted on the shaft with the inside diameter of the shaft being press fit onto the shaft. A plurality of rollers, being captured in a cage, are entrapped between the races to accommodate relative rotation. The inner race, by virtue of its contact with the rollers and the outer race is also prevented from movement in one axial direction. In order to prevent movement of the bearing assembling in the other axial direction, the inner race is normally positioned on the shaft adjacent a threaded portion that accepts a spanner nut. The spanner nut may be threaded onto the shaft to axially position it in abutting engagement with the inner race. Being so positioned, the spanner nut limits the axial movement of the bearing assembly in a second axial direction. The spanner nut may be threaded along the shaft to put a predetermined amount of pressure on the inner race to establish an appropriate amount of "pre-load" in the bearing assembly. To prevent the rotation of the spanner nut and the resultant loss of the properly established pre-load, the spanner nut must also be secured. This is normally done by a circular lock washer that has a protrusion on its inner diameter and tabs on its outer diameter. The inner protrusion is positioned within a keyway in the shaft so that relative rotation is prevented there between. The outer tabs are then normally bent over one of the flats on the spanner nut to thereby also prevent its rotation with respect to the shaft. An example of such a locking arrangement is disclosed in U.S. Pat. No. 4,163,486 issued to T. Kagata on Aug. 7, 1979.

While this method has been used successfully for many years, it does have severe drawbacks when applied to a drive mechanism that is extremely compact. In these instances the shaft, for example, is of a diameter that is necessarily very small. The placement of the keyway in the shaft to accommodate the lock washer will weaken the shaft to a point that will not allow it to survive the loading it will be subjected to in a gear drive assembly.

Another problem exists in environments such as that of the subject application where the bearing assembly is located on an inboard portion of an axle. Once assembled, access to the bearing assembly to bend the outer tabs over the spanner nut is often non-existent or very limited.

The present invention is directed to overcoming one or more of the problems as set forth above.

DISCLOSURE OF THE INVENTION

In one aspect of the present invention a mounting apparatus for a bearing assembly is disclosed that includes a first member and a means for fixing the position of the bearing assembly upon the first member. A second member having a flange portion defined thereon is positioned on the first member in a manner wherein the flange member is placed in close proximity to the positioning means to limit the movement of the positioning means and the bearing assembly. A means for securing the position of the second member with respect to the first member is also included.

By utilizing a mounting arrangement as described above, the overall design of the particular drive mechanism may remain very compact. This is due in part because of the utilization of an existing component as a locking member. Also, since it is not necessary to cut a keyway in any of the components of the drive mechanism, the size of the components may be greatly reduced and still provide adequate strength.

BRIEF DESCRIPTION OF THE DRAWINGS

FIG. 2 is an enlarged sectional view of the differential assembly as indicated in FIG. 1.

FIG. 3 is an enlarged sectional view taken along lines III—III as indicated in FIG. 2.

BEST MODE FOR CARRYING OUT THE INVENTION

Figure 1:
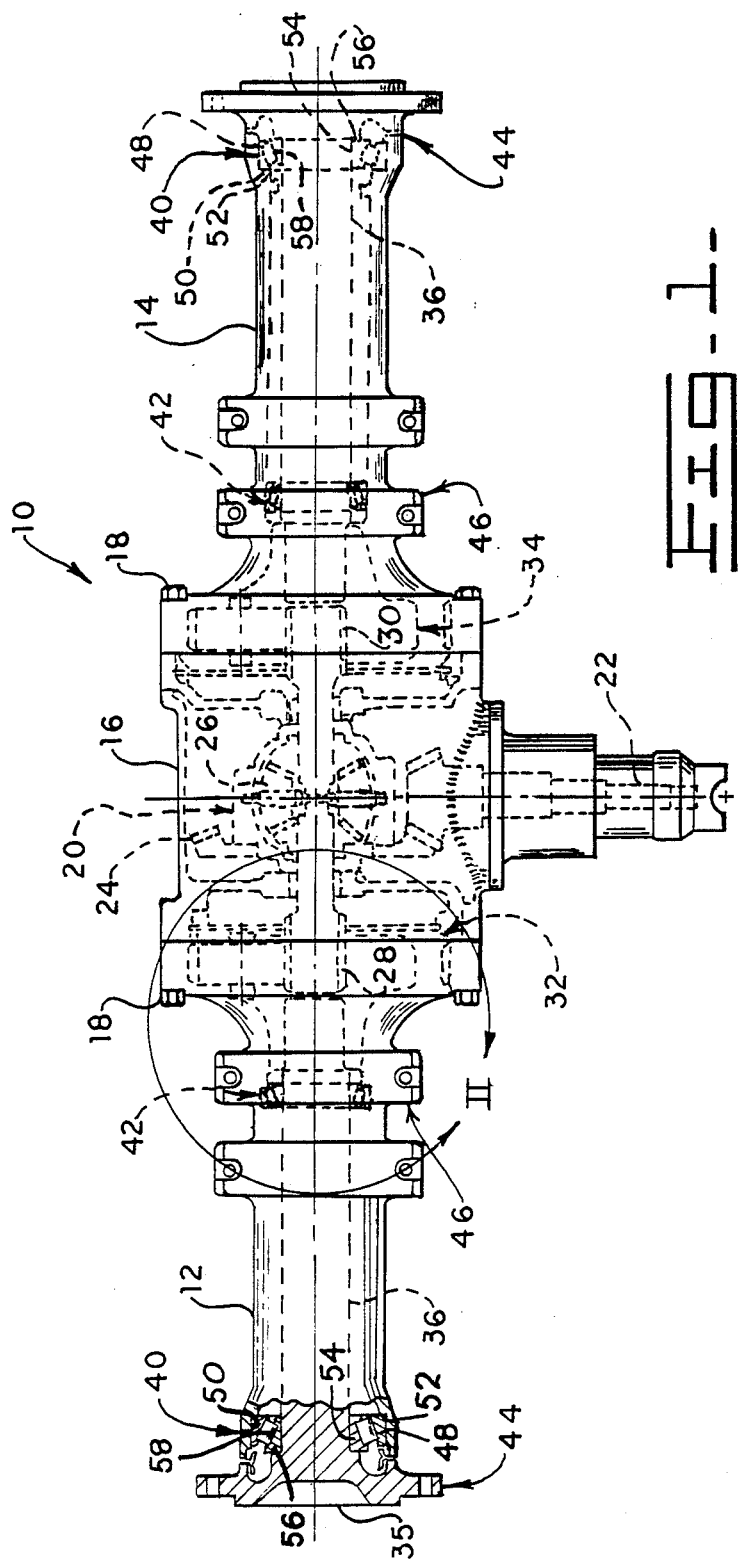
FIG. 1 is a diagrammatic representation of a differential assembly that embodies the principles the present invention.

Referring to the drawings, and more particularly to FIG.1, an axle assembly 10 is shown including a pair of axle housings 12,14 that are positioned on opposite sides of a central differential housing assembly 16. The axle housings 12,14 are attached to the differential housing 16 by a plurality of bolts 18. Within the differential housing, a differential 20 of a commonly known design is mounted. Input to the differential 20 is directed from a driven source, such as the output of the vehicle power train (not shown), via a pinion shaft 22 to a bevel gear member 24. The drive is transmitted from the bevel gear 24 through a plurality of pinion gears 26 to a pair of differential output shafts 28,30 that extend from the differential 20. The differential output shafts 28,30 are each engaged with a gear reduction mechanism 32,34 that in turn directs the drive through each of the axle housings 12,14 in a manner t be described hereinafter.

Because each axle housing is identical, only one will be described hereinafter, it being understood that the same reference numerals will refer to like components in each of the axle housings 12,14. Within the axle housing 12 a first member 35, which in the illustrated embodiment is an axle shaft 36, is supported for relative rotation with respect to the housing. The axle shaft 36 is supported by a pair of roller bearings 40,42 that are spaced apart at the inner and outer portions 44,46 of the axle housing.

The first, or outer bearing assembly 40, is positioned between the axle housing 12 and the axle shaft 36 at a location that is adjacent the wheel (not shown) of a vehicle. An outer race member 48 is pressed into a counterbore 50 formed by the axle housing. The race is pressed into contact with a radially extending lip 52 of the counterbore 50 and thereby serves to limit the axially inward movement of the outer race 48. An inner race 54 of the bearing assembly 40 is positioned on the axle shaft 36 and is placed in contact with an inwardly facing, radially extending lip 56 that limits the axially outward movement of the inner race. A roller bearing cage 58 is captured between the outer and inner races 48,54 in a well known manner to accommodate relative rotation between the axle and the axle housing.

The second or inner bearing assembly 42, which is shown in greater detail in FIG. 2, is positioned between the axle shaft 36 and the axle housing 12 at a location that is adjacent an inner portion 44 of the axle housing 12. An outer race member 60 is pressed into a counterbore 62 formed by the axle housing 12. The race engages a radially extending lip 64 defined by the counterbore 62 and thereby defines the axially outward limit for the race member 60. An inner race member 66 is positioned on the shaft in a manner to capture a roller bearing cage 68 between the outer and inner races 60,66 in a well known manner. An axial positioning means 69 in the form of a nut member 72 is utilized to contact the inner race 66 along an inwardly facing surface 70 thereof to maintain the axial position of the inner race with respect to the shaft. The nut member 72 is threadably engaged with a threaded portion 74 of the shaft 36.

Inboard of the threaded portion 74 of shaft 36 are formed a plurality of external splines 76 on the innermost end 78 of the axle shaft 36. A second rotary member 79 in the form of a support member, or as illustrated, a planet carrier 80, defines a plurality of internal splines 82 about a central bore 83 formed therethrough. The splines 82 intermesh with the external splines 76 of the axle shaft 36 to complete a splined connection 84 between the two components causing them to rotate together. The planet carrier 80 mounts a plurality of planetary gears 86 that are engaged with a sun gear 88 that is formed on the outboard end 90 of the differential output shaft 28. Being so mounted, the planetary gears 86 and carrier 80 act as a speed reduction arrangement as they transmit the drive from the sun gear 88 to the axle shaft 36. The planet carrier is mounted to the axle shaft 36 by a securing means 91 that includes a snap ring 92 that engages a shallow circumferential groove 94 defined on the end 78 of shaft 36. The planet carrier 80 is thus trapped between the nut member 72 and the snap ring 92 to constrain the axial movement of the carrier 80. The carrier 80 is provided with an outwardly extending flange portion 96 on an outboard surface 98 thereof. The flange 96 is configured such that it is positioned in overlying relationship to one of the flat portions 100 defined by the nut member 72 as is best illustrated in FIG. 3. The flange member 96 is spaced radially from the nut member 72 to allow only a preselected amount of rotation with respect to the planet carrier 80 before one of the corners 102 defined by the nut member comes in contact with the flange 96, thus preventing further rotation.

INDUSTRIAL APPLICABILITY

Assembly of the components within the axle housings 12,14 is done prior to their connection with the differential housing 16. To begin the building of an axle house, for example axle housing 12, the outer races 48, and 60 of the first and second bearing assemblies 40, and 42 are pressed into position within the axle housing. Likewise, before positioning the axle shaft 36 within the housing 12, the inner race 54 of the outer bearing assembly 40 is pressed into position against the radially extending lip 56 formed on the axle shaft 36. With the roller cage assembly 58 in place on the inner race 54, the axle shaft 36 is inserted into the axle housing 12 until the roller cage is captured between the outer and the inner races 48,54. The roller bearing cage 68 and the inner race member 66 of the inner bearing assembly 42 are then placed about the axle shaft 36 in a manner to position the roller bearing cage 68 between the outer and inner races 60,66. The nut member 72 is then threaded onto the axle shaft 36 and tightened against the inner race member 66 to a preselected torque. The amount of torque applied to the nut member 72 sets the proper pre-load in each of the outer and inner bearing assemblies 40,42 and also secures the axial position of the axle shaft 36 with respect to the housing 12.

The planet carrier 80 is then mounted on the axle shaft 36 by matching the internal splines 82 defined on the carrier 80 with the external splines 76 on the axle shaft 36. In doing so, however, the splines 82 on the carrier 80 must be properly located with respect to the splines 76 on the axle shaft 36 so that when the carrier 80 is moved axially along the axle shaft 36 into position, the flange member 96 will overlie one of the flats 100 defined on the nut member 72. In the event that the carrier 80 comes into contact with corners 102 on the nut member 72 and is prevented from assuming its proper position, the carrier must be removed from engagement with the axle shaft 36 and rotated to adjust the position of the flange 96 with respect to the nut member 72. When this occurs it is desirable that the carrier 80 be rotated in either direction to achieve proper fit up without adjustment of the position of the nut member 72. In the present invention, this is accomplished by configuring the splined connection 84 such that it is comprised of a preselected number of teeth that are spaced from each other a preselected angular distance. This relationship, coupled with the radial spacing of the flange member 96 from the axle shaft 36, permits the flange member to accommodate an amount of rotation, in either direction with respect to the nut member 72, that is equal to one-half the angular distance established between the teeth. Once the carrier 80 has been mounted on the axle shaft 36 with the flange member 96 in proper relation to the nut member, the snap ring groove 94 in the axle shaft will become accessible. The snap ring 92 may then be inserted into the groove to secure the carrier axially upon the axle shaft 36. After the carrier is in place, the assembly of the drive axle housing 12 is complete, whereupon each drive axle housing 12,14 is then connected to the central differential axle housing 16.

By utilizing the flange member 96 on the adjacent planetary carrier 80 to prevent rotation of the nut member 72, the bearing assemblies 40,42 may be maintained under proper pre-load without utilizing specific locking components. This greatly simplifies the method of assembly by reducing the required number of components and eliminating the need to gain access to a lock washer or similar component after the proper pre-load has been obtained. In addition to eliminating unnecessary parts, it also eliminates the need for machining a keyway in the axle shaft 36. Since no keyway is required, the fatigue life and strength of the shaft is greatly increased. This, in turn, allows the shaft and the entire drive assembly to be of reduced size resulting in a very compact drive mechanism.

Other aspects, objects and advantages of this invention can be obtained from a study of the drawings, the disclosure and the appended claim.

I claim:

1. A mounting arrangement for a bearing assembly, comprising:
   a first member having a plurality of splines defined on a portion thereof;
   means for fixedly positioning the bearing assembly on the first member;
   a second member having a flange portion defined thereon and a plurality of splines formed therethrough, said second member being so constructed and arranged as to be positioned on the first member with the splines thereof in intermeshing engagement with the splines of the first member and at a location adjacent the positioning means with the flange portion in close proximity thereto to limit the movement of the positioning means and the bearing assembly; and
   means for securing the position of the second member with respect to the first member.

2. The mounting arrangement as set forth in claim 1 wherein the positioning means includes a nut member that is threadably engaged with the first member and axially locates the bearing assembly on said first member.

3. The mounting arrangement as set forth in claim 1 wherein the second member is a support member.

4. The mounting arrangement as set forth in claim 3 wherein said support member is a carrier for a plurality of planet gears, said planet gears being supported for driving engagement with a sun gear wherein rotation of the sun gear provides rotation of said first member.

5. The mounting arrangement as set forth in claim 1 wherein the bearing assembly includes a tapered roller bearing having inner and outer races, said inner race being mounted on said first member and being in abutting engagement with the positioning means and said outer race being press-fit into engagement with a housing member, said bearing assembly being sufficient for supporting the first member for rotation with respect to the housing member.

6. The mounting arrangement as set forth in claim 1 wherein the securing means includes a snap ring positioned within a groove that is formed in said first member to limit axial movement of the second member with respect to said first member.

7. The mounting arrangement as set forth in claim 1 wherein the number of splines defined by said first and second members is selected to establish a preselected angle or pitch between said splines.

8. A mounting arrangement as set forth in claim 7 wherein the flange portion of the second member extends laterally therefrom to a position overlying the nut member and being radially spaced from the nut member a distance sufficient to accommodate relative rotation of the flange portion with respect to the nut member an amount approximately equal to plus or minus one half of the preselected angle between said splines.

9. In a housing having a first member disposed therein and being rotatable with respect to said housing a mounting arrangement for a bearing assembly positioned therebetween, comprising:
   means for fixedly positioning the bearing assembly on the first member;
   a plurality of splines formed on the first member adjacent the positioning means;
   a second member having a flange portion and a plurality of splines defined thereon and being positioned on the first member with the splines thereof in intermeshing engagement with the splines of the first member to rotatably mount the second member thereto with the flange portion in close proximity to the positioning means to limit the movement of the positioning means and the bearing assembly; and
   means for securing the second member to the first member.

10. The mounting arrangement as set forth in claim 9 wherein the positioning means includes a nut member that is threadably engaged with the first member and is axially moveable there along to a position wherein it is in abutting engagement with said bearing assembly to limit the axial movement of the bearing assembly.

11. The mounting arrangement as set forth in claim 9 wherein the second member includes a planet carrier having plurality of planet gears supported thereby and a centrally disposed bore formed therethrough, said splines being formed internally about the bore.

12. The mounting arrangement as set forth in claim 9 wherein the splines formed on the first and second members are circumferentially spaced from one another a distance that enables a preselected angle or pitch between the splines.

13. The mounting arrangement as set forth in claim 12 wherein the flange portion of the second member extends laterally therefrom to a position overlying the positioning means and being spaced therefrom in a radial direction to accommodate an amount of misalignment equal to plus or minus one half of the preselected angle between said splines.

14. A mounting arrangement for a bearing assembly, comprising:
   a shaft having a plurality of longitudinal splines formed on one end and a threaded portion inboard of said splines;
   a bearing assembly mounted on the shaft at a location that is outwardly adjacent to the threaded portion;
   a nut member having at least one flat portion defined on its periphery and being engageable with the threaded portion of the shaft and the bearing assembly to position the bearing assembly with respect to the shaft;
   a support member having a centrally disposed bore formed therethrough, a plurality of splines defined in said bore and at least one flange portion extending outwardly from the support member, said support member being engageable with the shaft and with the respective splined portions in mating engagement with each other and being positioned on the shaft such that the flange portion thereof is in overlying relation to said flat portion on said nut member so as to limit the rotation of the nut member with respect to the shaft; and means for securing the position the support member with respect to the shaft.

15. The mounting arrangement as set forth in claim 14 wherein the securing means includes a snap ring that engages a groove that is defined in the shaft.

16. The mounting arrangement as set forth in claim 15 wherein the shaft is disposed within a housing and is supported by the bearing assembly for rotation with respect to the housing.

17. The mounting arrangement as set forth in claim 16 wherein the bearing assembly further includes a tapered roller bearing having an inner race that is positioned about the shaft and an outer race that is press-fit onto the housing and a plurality of rollers positioned between said races to permit rotation of the shaft with respect to the housing.

18. The mounting arrangement as set forth in claim 15 wherein the support member includes a planet carrier having a plurality of planet gears supported for rotation with respect to said support member, said planet gears being engaged with a driven sun gear to transmit rotation to the support member and the shaft.

* * * * *

(12) REEXAMINATION CERTIFICATE (4370th)
United States Patent
Rieke

(10) Number: US 4,883,373 C1
(45) Certificate Issued: Jun. 5, 2001

(54) MOUNTING ARRANGEMENT FOR A BEARING ASSEMBLY

(75) Inventor: Brent E. Rieke, Aurora, IL (US)

(73) Assignee: Caterpillar Inc., Peoria, IL (US)

Reexamination Request:
No. 90/005,693, Apr. 3, 2000

Reexamination Certificate for:
Patent No.: 4,883,373
Issued: Nov. 28, 1989
Appl. No.: 07/258,532
Filed: Oct. 17, 1988

(51) Int. Cl.$^7$ .................................................. F16C 19/38
(52) U.S. Cl. .......................................... 384/585; 384/539

(56) References Cited

U.S. PATENT DOCUMENTS

| | | | |
|---|---|---|---|
| 1,645,503 | * 10/1927 | Vile | 384/540 |
| 3,112,965 | * 12/1963 | Popiel | 384/585 |
| 4,029,166 | 6/1977 | Haak | 180/9.62 |
| 4,163,486 | 8/1979 | Kagata | 192/35 |
| 4,210,372 | 7/1980 | McGee et al. | |

OTHER PUBLICATIONS

John Deere 4050 Axle Assembly shown in Drawing Y313 alleged date is 1982.
Portions of a ZF Series 300 Transmission manual alleged date is 1970.

* cited by examiner

Primary Examiner—L. Footland

(57) ABSTRACT

In a drive mechanism where there are relatively rotating components, it is common practice to use roller bearings to accommodate relative rotation between various components. In order to properly maintain the position of the bearing assembly with respect to the components, some form of locking mechanism is commonly employed. Normally, the locking mechanism requires additional components, such as a locking washer, to be used in conjunction with those used to mount the bearing assembly. This results in an increase in the size and complexity of the drive mechanism. In addition, when a locking washer is utilized, sufficient space must be available to properly "set" the locking washer with respect to the bearing assembly after it has been properly adjusted. Many times use of such locking components requires the machining of adjacent components which serves to anchor the locking mechanism. The additional machining requires the components to be of a larger size to obtain proper fatigue lift. This, coupled with the cost of the additional machining, greatly increases the expense of the unit. The present invention overcomes these drawbacks by providing a locking mechanism that utilizes a nut member 72 that is threaded on a shaft 36 to position a bearing assembly 42 on the shaft 36. A planet carrier 80 is splined to the shaft 36 adjacent the nut member 72 to prevent it from rotation with respect to the shaft 36. The configuration of the spline arrangement 76,82 permits easy installation of a bearing assembly 40,42 in areas that are inaccessible with very little adjustment required to achieve proper assembly.

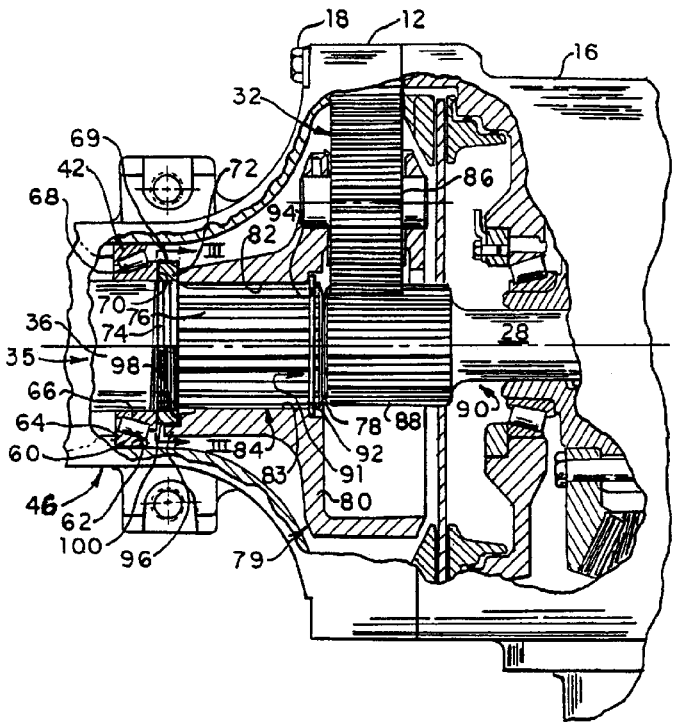

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *